United States Patent
Lippold et al.

(10) Patent No.: US 8,015,838 B2
(45) Date of Patent: Sep. 13, 2011

(54) ON-BOARD INERT GAS GENERATION TURBOCOMPRESSOR SYSTEMS AND METHODS

(75) Inventors: Timothy J. Lippold, Huntington Beach, CA (US); Giorgio C. Isella, Culver City, CA (US); Jeff A. Lotterman, Torrance, CA (US); Jon E. Schryver, Redondo Beach, CA (US)

(73) Assignee: Honeywell International Inc., Morristown, NJ (US)

( * ) Notice: Subject to any disclaimer, the term of this patent is extended or adjusted under 35 U.S.C. 154(b) by 1151 days.

(21) Appl. No.: 11/962,591

(22) Filed: Dec. 21, 2007

(65) Prior Publication Data
US 2010/0310392 A1   Dec. 9, 2010

(51) Int. Cl.
*F25D 9/00*   (2006.01)
(52) U.S. Cl. .......................................... 62/401
(58) Field of Classification Search ............... 62/401, 62/402, 419; 417/405; 415/177
See application file for complete search history.

(56) References Cited

U.S. PATENT DOCUMENTS

| | | | |
|---|---|---|---|
| 4,560,394 A * | 12/1985 | McDonald et al. | 95/54 |
| 5,388,413 A | 2/1995 | Major | |
| 5,607,903 A | 3/1997 | Bastos | |
| 6,402,812 B1 * | 6/2002 | Perrotta et al. | 95/95 |
| 7,048,231 B2 | 5/2006 | Jones | |
| 7,219,510 B2 | 5/2007 | Jones | |
| 2007/0000380 A1 | 1/2007 | Leigh et al. | |
| 2007/0004326 A1 | 1/2007 | Haas et al. | |
| 2007/0054610 A1 | 3/2007 | Jensen | |
| 2007/0144347 A1 | 6/2007 | Snow | |

* cited by examiner

*Primary Examiner* — Melvin Jones
(74) *Attorney, Agent, or Firm* — Oral Caglar, Esq.

(57) ABSTRACT

The present invention provides a system and method for cooling the bleed air supply in an on-board inert gas generation system. The gas generation system cools the bleed air using a turbocompressor in conjunction with heat exchangers. Exhaust from a regenerative heat exchanger providing air to the turbocompressor is ported to a ram air outlet using a flow-restriction/ejector unit.

20 Claims, 4 Drawing Sheets

ON-BOARD INERT GAS GENERATION TURBOCOMPRESSOR SYSTEMS AND METHODS

BACKGROUND OF THE INVENTION

The present invention generally relates to gas generation systems and particularly to systems and methods for on-board inert gas generation with a turbocompressor, used to inert fuel tank ullage space of aircraft.

As the fuel level is reduced within aircraft fuel tanks, the ullage space that develops in the fuel tank contains potentially combustible combinations of oxygen and fuel vapors in dangerous proximity to a variety of possible ignition sources. The conditions present within the ullage space change during the course of a flight and depending on the temperature, pressure and fuel type, a catastrophic explosion may result. Limiting the oxygen content within the ullage space of a fuel tank significantly helps to immunize a fuel tank from explosions. Industry standards have suggested various limits for the oxygen content of gaseous fill in the ullage space of a fuel tank. For example, current standards suggest that the minimum amount of oxygen needed to sustain combustion at sea level is slightly less than 12%. That amount increases to 14.5% at 30,000 feet above sea level.

Attempts have been made to reduce the oxygen level in aircraft fuel tanks by providing fuel tank foam systems to arrest explosions. Foam inerting systems typically require initially displacing approximately 3.5% of the volume of the tank, reducing the amount of fuel that can be carried by the aircraft. Maintenance requires periodic removal of the foam, a task that involves significant dismantling and down-time Nitrogen-generating systems (NGS) have been used to inert the ullage space by introducing nitrogen enriched air into the fuel tanks, significantly reducing the amount of oxygen present. Typically, an NGS passes compressed air from the engines through filters to separate out the nitrogen content, which is then piped into aircraft fuel tanks.

An on-board inert gas generation system typically involves a sequence of thermal and pressure variations of gases moving through the aircraft and eventually expelled by the aircraft into ambient temperatures and pressures. In high-altitude and fast-moving aircraft, small variations of temperature and pressure created by the expulsions can introduce forces that may disrupt the efficient flight performance of the aircraft.

As can be seen, an on-board inert gas system that produces required quantities of inert gas while minimizing potentially disruptive exhaust conditions is needed.

SUMMARY OF THE INVENTION

A thermal control module of a gas generation system comprises a turbine wheel connected to a pressurized air supply such that the pressurized air from the pressurized air supply rotating the turbine wheel becomes cooled air. A regenerative heat exchanger receives cooled air from the turbine wheel. The regenerative heat exchanger receives pressurized air and cools the pressurized air to generate cooled air and exhaust air. A compressor is rotated by the turbine. The rotating compressor receives the cooled air from the regenerative heat exchanger and generates compressed air. An ejector is connected to the regenerative heat exchanger and provides the turbine exhaust air into ram air flow. The pressure ratio across the turbine wheel remains stable relative to altitude changes A gas generation system comprises a control valve connected to a bleed air supply and controlling the flow of the supplied bleed air. A turbocompressor having a turbine and a compressor is connected to the control valve. Bleed air rotates the turbine and is evacuated as turbine exhaust air. A regenerative heat exchanger receives bleed air. The bleed air is cooled by passing turbine exhaust air in thermally conductive proximity to the bleed air. The turbine exhaust air is ported into ram air. The turbine rotates the compressor and the compressor receives the cooled bleed air to generate compressed air. A primary heat exchanger receives compressed air from the turbocompressor. The primary heat exchanger cools the compressed air by passing the compressed air in thermally conductive proximity to ram air.

A method of gas generation thermal control comprises the steps of generating rotational motion in a turbine using bleed air and rotating a compressor using the rotational motion. Bleed air received at a regenerative heat exchanger is cooled with cooled air from the turbine. Cooled bleed air is compressed by the compressor. The exhaust air from the regenerative heat exchanger is ported to a ram air outlet.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention provides an on-board inert gas generation system including a turbocompressor thermal control subsystem that may be incorporated in a wide variety of aircraft. Aircraft designed for either high-altitude or high-speed or both are particularly well suited to the introduction of the turbocompressor thermal control subsystem. One embodiment of the present invention generates inert gas from an air stream by isolating the inert gas, typically nitrogen, from an air mixture and providing the isolated nitrogen for use as an inerting agent. Air from a jet engine that is otherwise vented overboard is processed to produce nitrogen enriched air (NEA) for introduction into an ullage space of a center wing fuel tank.

A low-velocity ejector is introduced into the thermal control subsystem to port exhaust from the turbocompressor turbine outlet to a regenerative heat-exchanger to the ram air flow. Connecting a heat exchanger providing air to the turbocompressor of an on-board inert gas generation system thermal control subsystem to the output of the ram air equalizes the pressure and temperature variances between the two portions of the thermal control.

Figure 1:
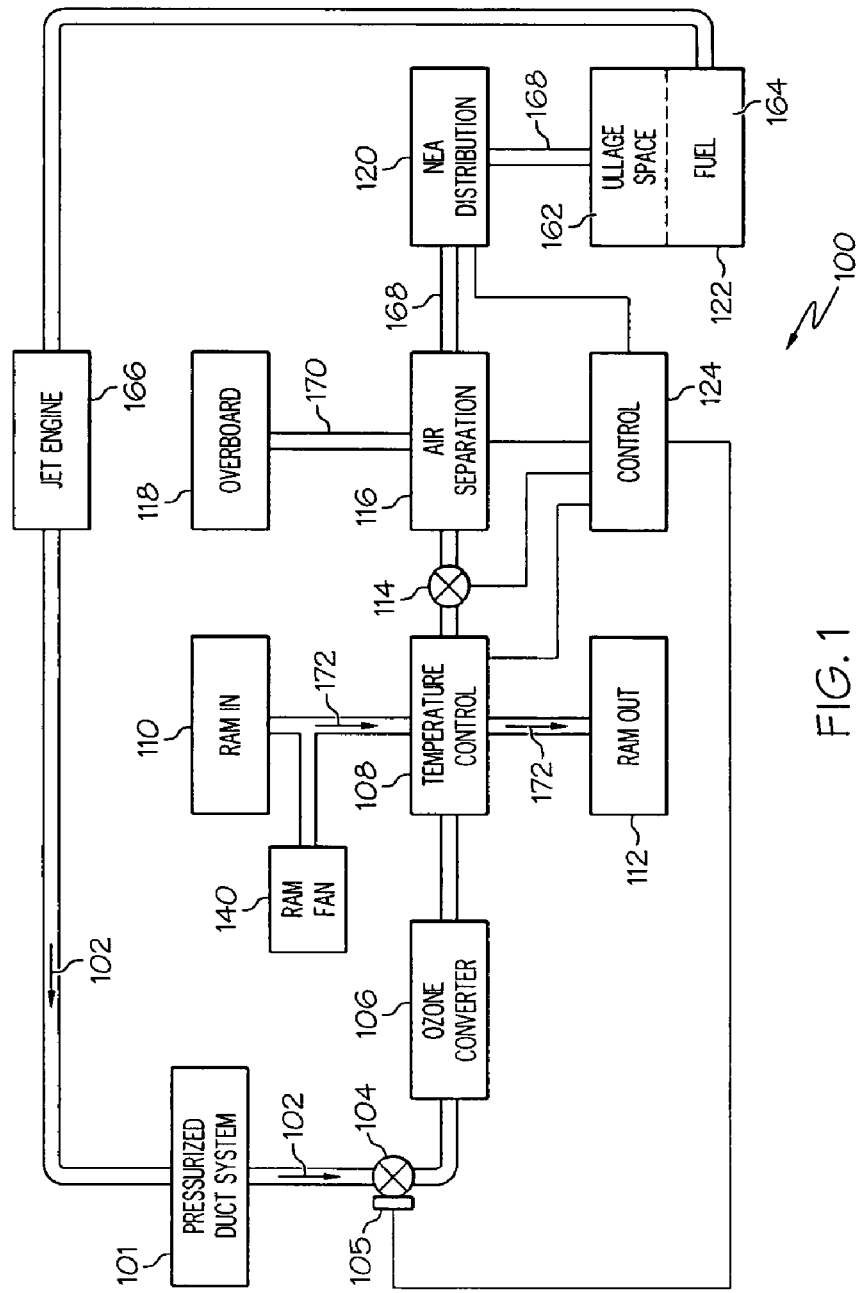
FIG. 1 depicts a block diagram of an on-board inert gas generation system in accordance with an embodiment of the present invention.

With reference to FIG. 1, a block diagram of an on-board inert gas generation system 100 in accordance with an embodiment of the invention is shown. The on-board inert gas generation system 100 may include a thermal control unit 108, an air separation unit 116, a nitrogen-enriched air distribution system 120 and a control system 124.

Bleed air 102 is high-temperature, high-pressure air taken from the compression stage within a jet engine 166, before fuel 164 is introduced to the compressed air. The bleed air 102 may be controllably provided to the gas generation system 100 through a control valve 104. Control valve 104 may be electrically controlled by control system 124 and pneumatically-operated. The control valve 104 may typically have a regulation set point at a specified gauge pressure to reduce the effects of higher bleed system pressures on maximum operating pressures.

Ozone may be removed from the bleed air 102 using an ozone/hydrocarbon converter 106, which may comprise a catalyst formulation effective for hydrocarbon oxidation as well as ozone decomposition, preventing the harmful effects of ozone on component materials such as those found in the air separation assembly 116. The hydrocarbon oxidation may form carbon dioxide and water in quantities that do not affect the cabin environment. After the highly corrosive ozone has been removed, the ozone/hydrocarbon converter 106 may provide the bleed air 102 to a temperature control system 108.

The temperature control unit 108 may use conventional heat transfer and heat management principles to control the delivery temperature of bleed air 102 from the jet engine 166 to the air separation modules 116.

Ram air 172 is ambient air forced through the aircraft by the velocity of the aircraft, from a ram intake 110 to a ram outlet 112. In some situations, for example when the aircraft is not moving, ram air 172 may be produced by a ram fan 140. Ram air 172 entering the ram intake 110 is typically substantially cooler than the bleed air 102. Consequently, the temperature control system 108 may use ram air 172 for cooling the bleed air 102. The ram air 172 may then be expelled through the ram outlet 112.

Cooled bleed air 102 provided by the temperature control system 108 may be controllably introduced to an air separation system 116 through a control valve 114. The air separation system 116 may generate distinct mixtures of gases having specific constituents, typically oxygen enriched air 170 and nitrogen enriched air 168. The oxygen enriched air 170 may be ported overboard through an outlet port 118. The nitrogen enriched air 168 may be supplied to a distribution system 120. The distribution system 120 may provide nitrogen enriched air to a fuel tank 122 where the nitrogen rich air fills the ullage space 162 in the fuel tank 122 left by the consumption of fuel 164 by the jet engine 166. A control system 124 may provide control signals to control valves 104 and 114. The control system 124 typically monitors and controls the temperature control system 108, the air separation system 116 and the nitrogen enriched air distribution system 120.

Figure 2:
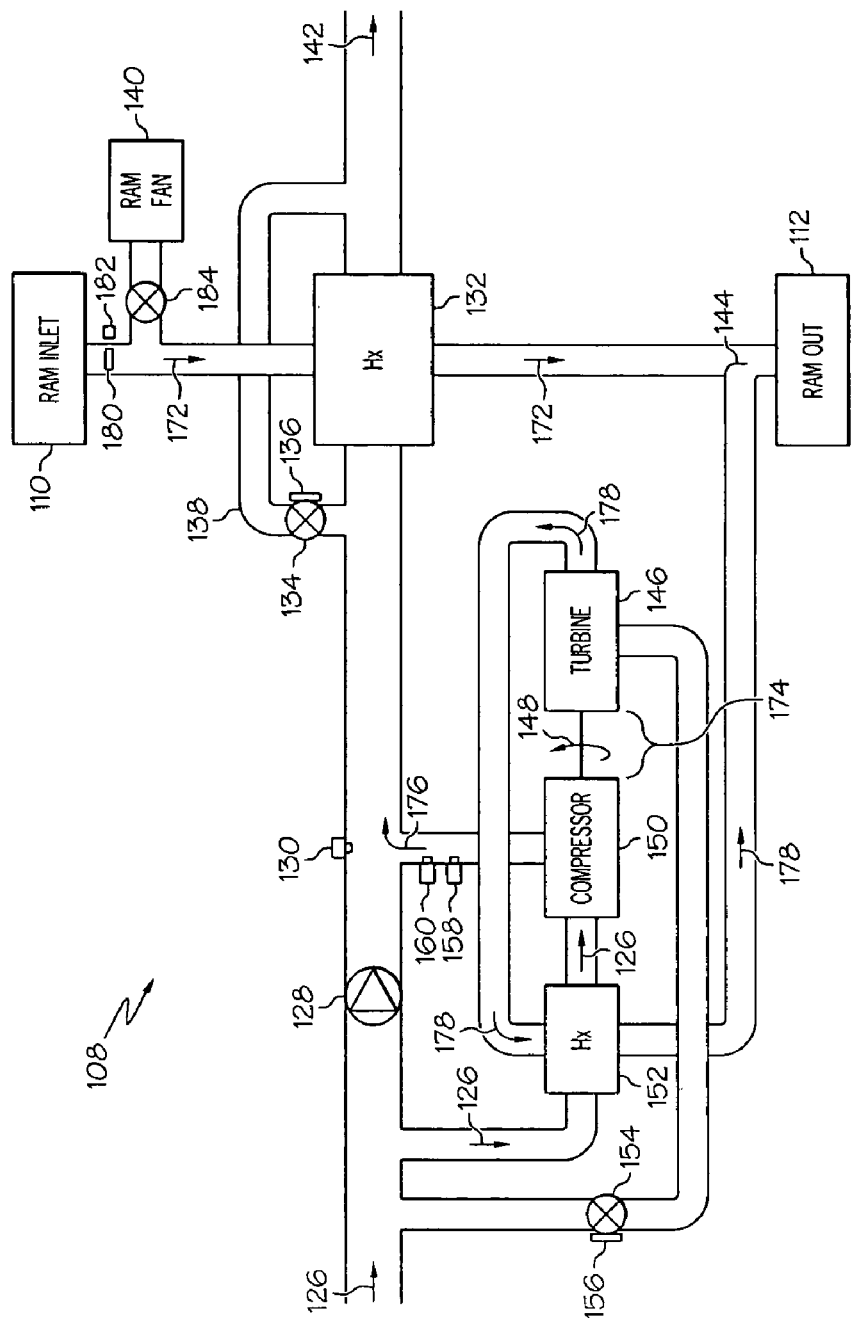
FIG. 2 depicts a block diagram of a thermal control module in accordance with an embodiment of the present invention.

With reference to FIG. 2, a block diagram of a temperature control system 108 in accordance with an embodiment of the invention is shown. Bleed air 102 with a reduced level of ozone may be introduced to the temperature control system 108 as incoming air 126. The incoming air 126 may typically be very hot and may be provided to a primary heat exchanger 132. The heat exchanger 132 may condition the hot, compressed bleed air 176 to a predetermined temperature prior to delivery to the air separation assembly 116. The heat exchanger 132 may also prevent hot bleed air 102 from entering the aircraft fuel tank 122 in the event of system failures of various types. The primary heat exchanger 132 cools the hot incoming air 176 and provides an outflow of cooled air 142.

The primary heat exchanger 132 may cool the incoming air 176 by placing the incoming air 176 in thermal conductive proximity to relatively cool ram air 172 received by the ram intake 110 and released by ram outlet 112.

A heat exchanger bypass 138 may be opened using a control valve 134 operated by solenoid 136. A turbocompressor shutoff valve 154 is operated by solenoid 156. When turbocompressor operation is initiated, the turbocompressor shutoff valve 154 may be opened to allow the incoming air 126 to pass to the turbine 146. The incoming air 126 expands and may rotate the turbine 146, inducing rotation of a common axle 148 and the compressor 150. The incoming air 126 may cool as it expands through the turbine 146 and the cool bleed air 178 may be then delivered to a regenerative heat exchanger 152 where the cooled bleed air 178 may act as a heat sink.

When the turbocompressor shutoff valve 154 is closed, the relatively higher pressure drop through the turbocompressor may cause the incoming air 126 to flow to the primary heat exchanger 132 and heat exchanger bypass 138. When the turbocompressor shutoff valve 154 is opened, incoming air 126 may rotate turbine 146 of turbocompressor 174. The rotating turbine 146 may rotate an axle 148 turning compressor 150. Opening the shutoff valve 154 may allow the incoming air 126 to enter the turbine 146. The incoming air 126 expands and may induce rotation of the turbocompressor 174. Incoming air 126 may be drawn through the compressor 150, where energy imparted by the compressor 150 may cause the incoming air 126 to be pressurized and heated into boosted air 176.

Rotation of the air cycle machine 150 may cause incoming air 126 to likewise be drawn first through the opposite (heat source) side of the regenerative heat exchanger 152 where the incoming air 126 may be cooled, and then may be drawn into the compressor 150 which pressurizes and heats the air. The compressed air 176 may be then delivered back to the temperature control system where the compressed air 176 may be thermally conditioned using a heat exchanger 132 and a temperature bypass valve 134 before the boosted air 176 may be filtered and delivered to the air separation module(s) 116.

The boosted air 176 may force the turbocompressor check valve 128 to close. Closing the turbocompressor check valve 128 may prevent backflow of the boosted air 176 into the sources of the incoming air 126.

To manage the temperature rise due to compression, the incoming air 126 may be cooled before entering the compressor 150 by a regenerative heat exchanger 152. Turbine discharge air 178 may be used by the regenerative heat exchanger 152 as a heat sink as the turbine discharge air 178 results when the incoming air 126 driving the turbine 146 may be cooled through expansion. Pre-cooling of incoming air 126 limits the temperature of the boosted air 176.

Turbine discharge air 178 exiting the regenerative heat exchanger 152 may move through a low-velocity ejector 144 that may be located downstream of the regenerative heat exchanger 152. The low-velocity ejector 144 may exhaust the turbine discharge air 178 into the ram air 172 as the ram air 172 approaches the ram outlet 112. The addition of turbine discharge air 178 may increase the flow of ram air 172 and may ensure the primary heat exchanger 132 can maintain temperature control for the air separation units 116 for all flight conditions. The turbine discharge air 178 exhausted by ejector 144 may increase the cooling margin during ground operations.

A temperature control system 108 of the on-board inert gas generation system 100 including a flow restrictor/ejector device 144 may maintain high turbine efficiency throughout an operational environment ranging from sea-level to high altitudes associated with commercial aircraft maximum cruising levels. The turbocompressor 174 may operate in a variation of a reverse Brayton cycle to remove heat from the incoming air 126 while increasing the pressure of the incoming air 126.

Gas separation performance of an aircraft on-board inert gas generation system 100 may be improved by increasing the pressure of the temperature control system outflow air 142 provided to the air separation modules 116. A flow restriction device 144 may be introduced to the exhaust of the regenerative heat exchanger 152 to improve the efficiency of the turbine 146. The flow restriction device 144 may act as an ejector and may induce additional air flow through a ram air outlet 112. The flow restriction device 144 may control the flow of turbine discharge air 178 and may thereby improve the efficiency of the turbine 146 for a wide range of operating conditions, as well as improving the flow of ram air 172 through the primary heat exchanger 132.

The turbine discharge air 178 may be provided to a regenerative heat exchanger 152 to cool incoming air 126 before the incoming air 126 may be provided to the compressor 150. The turbine discharge air 178 may be heated by the heat exchanger 152 and may be provided to flow restriction ejector 144. The flow restriction ejector may route the turbine discharge air 178 into the stream of ram air 172 moving toward the ram outlet 112.

A temperature sensor 158 may provide temperature readings of the boosted air 176 to control system 124. To protect against overheating, a temperature responsive switch 160 may turn off the gas generation system 100 in response readings from the temperature sensor 158. A pressure sensor 130 may provide pressure readings of the boosted air 176 (or incoming air 126) to a control system 124. A check valve 128 may prevent backflow of the boosted air 176 to the incoming air 126.

In various embodiments, control and monitoring functions of the gas generation system 100 may be performed by a central control unit 124. The control system 124 may ensure temperature regulation of bleed air 102 entering the gas generation system 100 and selective shutoff with control valve 114 preventing introduction of further bleed air to the air separation assembly 116 in the event of overtemperature and/or overpressure conditions. Typically, a cooling air such as ram air 172 may be used to cool bleed air 126 to temperatures acceptable for entry into the air separation assembly 116. Ram cooling flow 172 to the gas generation system 100 may flow in any mode of airplane operation.

During in-flight operations, cooling air—such as ram air 110—may provide temperature reduction for the bleed air 102 entering the gas generation system 100. The ram fan 140 may remain off in flight, and may be turned on when the aircraft is landed. The ram air 172 provided by the ram fan 140 may be used to cool the bleed air 126 entering the gas generation system 100.

A temperature sensor 158 and thermal switch 160 may be installed downstream of the compressor discharge 176 to protect the system against overtemperature conditions. The thermal switch may be electrically connected in series to the turbocompressor valve solenoid 156. When the thermal switch set-point is reached, the solenoid current source may be interrupted, allowing the solenoid 156 and turbocompressor valve 154 to close. The temperature sensor 158 may be connected to the controller 124 and may sense high compressor outlet temperature. When compressor outlet reaches a specified value, the turbocompressor valve 154 may be commanded closed. Normally aspirated nitrogen generation system 100 may remain operational. In the remote event that the turbocompressor valve 154 is failed open and the overheat condition persists for several seconds, the control valve 104 may be commanded closed as well.

The boosted system architecture may include a pressure sensor 130 downstream of the control valve 104, the turbocompressor valve 154 and turbocompressor 150. The pressure sensor 130 may be used for fault detection of those components. Bleed air temperature downstream of the primary heat exchanger 132 may be controlled by-passing air through the temperature control valve 134, to achieve the target set-point at the inlet of the air separation unit 116. The incoming air 172 passing through the temperature control valve 134 and heat exchanger 132 may be merged.

After the controller 124 is powered up, a controller startup mode may be activated and all outputs are default to "off" by the controller 124. In a controller startup mode, a power-up self-test may detect failure of processing hardware within the controller 124. Upon successful self-test, the controller 124 may make the transition from a controller startup mode to a system control mode for standard NGS operations. If a controller critical fault is detected and is not recoverable after three processor resets, a system failsafe mode may be activated and the controller 124 may de-energize output drives and the NGS may be shut down.

On warm start, the controller 124 may skip the self-test and return to the previous mode directly. In a system control mode, a start built-in test may be implemented to detect a failed open condition of the control valve 104 and the overtemperature valve 114 at a beginning of the flight. Subsequently, a continuous built-in test may be implemented to detect a NGS failure continuously and reconfigure the system as required to maintain continued safe system operation.

The supply flow 126 may be taken directly from a bleed crossover duct and routed to a control valve 104. The shutoff valve 104 may be designed to operate in a regulated on or off state. The valve 104 may provide overpressure regulation of the inlet pressure to a specified value to minimize the probability of providing excessive pressure (and resulting flow) to other components in the gas generation system.

The control valve 104 may be a normally closed, solenoid-controlled, pneumatically actuated valve. An electrical signal to the solenoid 105 may allow the valve 104 to open or close in the presence of pneumatic pressure. When the system is commanded off by the controller 124, the solenoid 105 may be de-energized and may prevent the valve 104 from opening. The controller 124 may act to close the shutoff valve 104 as part of normal system operation as well as for failure condition such as in the case of the airplane-level shutdown conditions, nitrogen generation system overtemperature detection, and overpressure conditions.

The supply flow 102 then may enter the ozone converter 106, which reduces the ozone content in the bleed air by catalytic conversion to oxygen. The ozone converter 106 may protect the air separation modules 116 from oxidation of membrane materials by ozone, which may lead to deterioration of the mechanical properties of the membrane.

If the turbocompressor shutoff valve 154 is closed, the bleed air 126 exiting the ozone converter 106 may pass through a turbocompressor check valve 128 and onward to the heat exchanger 132. The heat exchanger 132 may be a compact, aluminum plate fin design. The temperature control valve 134 may be modulated by the controller 124 to provide temperature control by bypassing bleed air around the heat exchanger 132 to maintain a specified temperature at the ASM inlet. The bleed air 126 may be cooled in the heat exchanger 132 by ram air drawn from outside the aircraft.

When the aircraft is on the ground, a fan 140 may be used to draw cooling air 172 across the heat exchanger 132. A ram door 180 may be used to block the ram air 172 when the gas generation system 100 is in a low-flow mode during cruise to reduce aircraft drag. The ram air door 180 may be opened and closed by an 182 actuator. A check valve 184 may be opened to allow ram air 172 to bypass the fan 140 during flight.

When the turbocompressor shutoff valve 154 is opened, incoming air 126 may pass to the turbine wheel 146 of the turbocompressor, allowing rotation 148 of the unit. Air 126 upstream of the compressor 150 may be then drawn through a regenerative heat exchanger 152 before entering the compressor section 150 of the turbocompressor, where the incoming air 126 may be compressed, diffused, and delivered back to the main bleed ducting. Two independent components installed downstream of the compressor 150 may be used to shut down the turbocompressor shutoff valve 154 to prevent the nitrogen enriched air flow from reaching a specified limit. The first component may be a temperature sensor 158, which may signal the controller 124 to shut down the turbocompressor shutoff valve 154 first, followed by the control valve 104, if necessary. An additional temperature switch 160 may be provided, which may interrupt the power to the turbocompressor shutoff valve 154, providing additional protection to the system independent of the controller 124.

Normal system operation may be initiated upon completion of the system initialization after takeoff. The on-board inert gas generation system 100 may operate in the low-flow mode (non-boosted) during climb and initial cruise operations until an air separation module warming time period has elapsed. At that point, the on-board inert gas generation system 100 may remain operating in low flow until an air separation module performance test is completed. After completion of the air separation module test, the control valve 104 and overtemperature shutoff valve 114 may be commanded to close and the system may be OFF.

The ram air door 180 may be set open whenever the on-board inert gas generation system 100 is ON and bleed air 102 is flowing. When the on-board inert gas generation system 100 is set to OFF during cruise, the ram air door 180 may be closed by the controller 124 to minimize cruise drag. The control valve 104 may be opened and the system may operate in low flow (with ram air door open) periodically during cruise to ensure the air separation module units 116 remain above a minimum temperature. Low-flow operation may be engaged primarily to ensure the on-board inert gas generation system's inerting performance on descent is not compromised due to a long interval for warming of cold-soaked units. The low-flow operation may pull down the oxygen concentration in the fuel tank 122, which otherwise increases as fuel 164 is burned off. An additional benefit is that the low-flow operation may provide increased surge margin for the compressor 150, since air separation module fiber constriction at cold temperatures may potentially restrict system flow capability.

Figure 3:
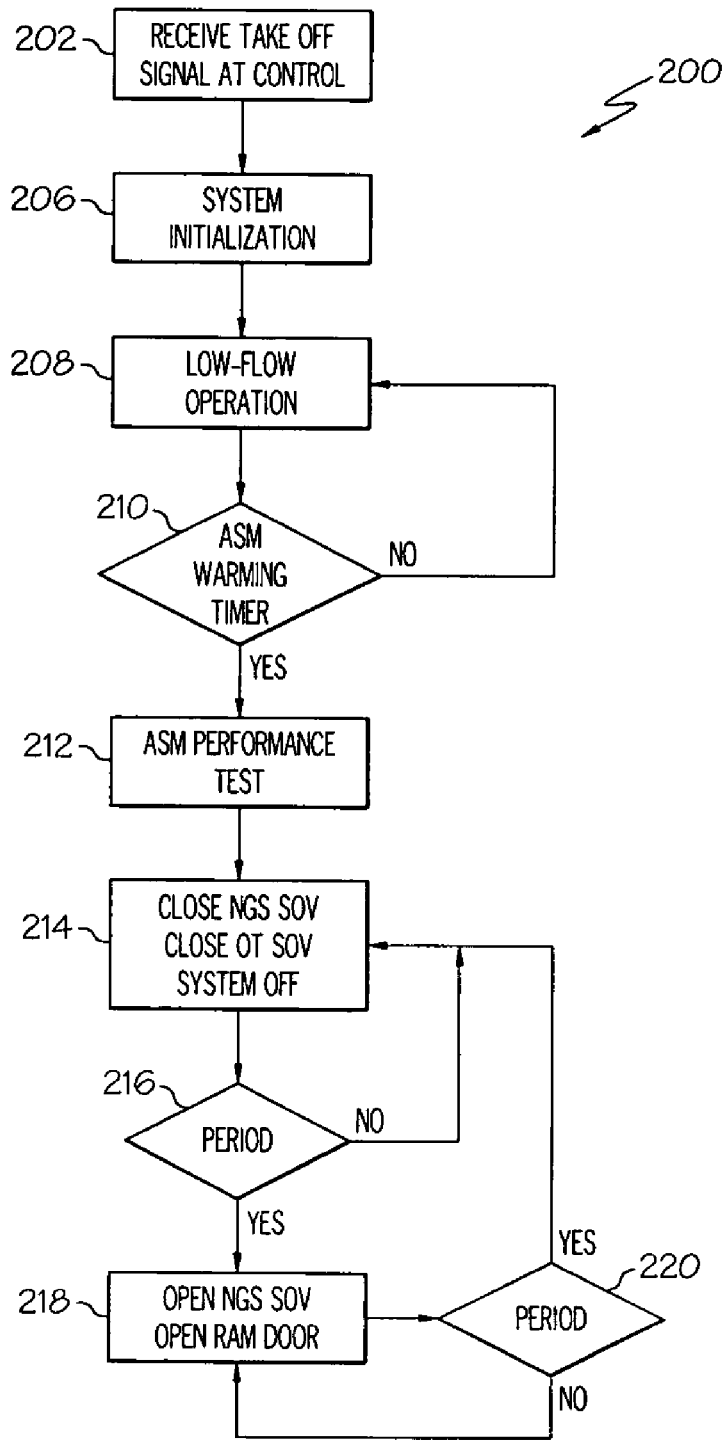
FIG. 3 depicts a method of operating a gas generation system during take-off and cruising, in accordance with an embodiment of the present invention.

With reference to FIG. 3, a flow chart depicting a gas generation process 200 during take-off and cruising in accordance with one embodiment is shown. A signal representing an aircraft take-off signal may be typically received by a control system 124 at function block 202. In response to receiving the take-off signal, the gas generation control system 124 may initialize an ascent gas generation process at function block 206. The gas generation control system 124 may establish low-flow operation by heating the air separation modules 116 at function block 208. The control system 124 may implement a warming timer to track time as the heating time approaches a pre-set warming period at decision block 210. Before the time has been sufficient to adequately warm the air separation modules 116, the process follows the NO path and continues low-flow operation at function block 208. If the time has permitted warming, the process follows the YES path and may perform an air separation module performance test at function block 212 to determine if the air separation modules 116 are generating adequate oxygen-nitrogen discrimination. When the performance tests are completed, the gas generation system may be turned off by closing the nitrogen generation system valve 104 and closing the overtemperature shutdown valve 114 at function block 214.

An operating period set point may be determined and the elapse of time may be measured until the operating set point is reached at decision block 216. Before the operating period set point has been reached, the process follows the NO path and the system remains off at function block 214. When the designated period has elapsed, the process follows the YES path. The nitrogen generation system shutoff valve 104 may be opened and the ram air inlet 110 may be opened at function block 218. An operating period end point may be determined and the elapse of time may be measured until the operating period end point is reached at decision block 220. Before the operating period end point is reached, the process may follow the NO path and may continue gas generation at function block 218. When the operating period end point has been reached, the process may follow the YES path and may turn the system off at function block 214.

Figure 4:
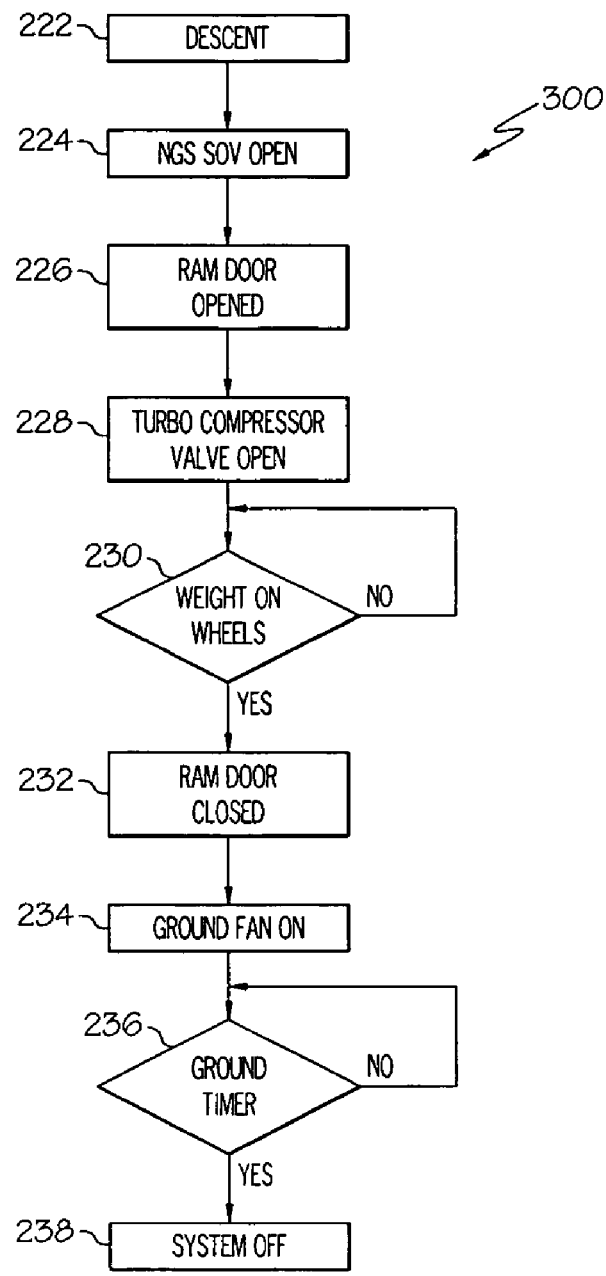
FIG. 4 depicts a method of operating a gas generation system during descent and landing in accordance with an embodiment of the present invention.

With reference to FIG. 4, a flow chart of a gas generation process 300 during descent and landing is shown. When the controller 124 receives a signal representing descent at function block 222, the nitrogen generation system shutoff valve 104 may be opened at function block 224. The ram door 180 may be opened at function block 226. The turbocompressor shutoff valve 154 may be opened at function block 228.

The process may continue until a weight-on-wheels condition is detected at decision block 230. Until the weight-on-wheels condition is detected, the process may follow the NO path and may continue monitoring. When a weight-on-wheels condition is detected, the process may follow the YES path and the ram door 180 may be closed at function block 232. A ground fan 140 may be turned on to provide ram air flow at function block 234.

A ground timer may determine the elapse of ground time at decision block 236. Until sufficient ground time has elapsed, the process may follow the NO path and may continue monitoring. When sufficient ground time has elapsed, the process may follow the YES path and the system may be shut down at function block 238.

It should be understood, of course, that the foregoing relates to exemplary embodiments of the invention and that modifications may be made without departing from the spirit and scope of the invention as set forth in the following claims.

We claim:

1. A thermal control module of a gas generation system comprising:
   a turbine wheel connected to a pressurized air supply such that the pressurized air from said pressurized air supply rotates the turbine wheel and said pressurized air becomes cooled air;
   a regenerative heat exchanger receiving cooled air from said turbine wheel, receiving pressurized air from said pressurized air supply, cooling said pressurized air to generate cooled air and generating exhaust air;
   a compressor rotated by said turbine wheel, receiving the cooled air from said regenerative heat exchanger and generating compressed air; and an ejector connected to said regenerative heat exchanger providing said exhaust air into ram air flow;

wherein the pressure ratio across the turbine wheel remains stable relative to altitude changes.

2. The thermal control module of claim 1, wherein said air supply has been depleted of ozone.

3. The thermal control module of claim 1, wherein said compressed air is provided to a primary heat exchanger.

4. The thermal control module of claim 1, wherein said air supply to the turbine is controlled with a turbocompressor shutoff valve.

5. The thermal control module of claim 1, wherein said regenerative heat exchanger is a plate-fin heat exchanger.

6. The thermal control module of claim 3, wherein said primary heat exchanger passes ram air through the ram air duct.

7. The thermal control module of claim 6 wherein said primary heat exchanger receives ram air through a ram air inlet.

8. The thermal control module of claim 6 wherein said primary heat exchanger receives fanned air through a ram air inlet.

9. A gas generation system comprising;
a bleed air supply;
a control valve connected to said bleed air supply and controlling flow of said supplied bleed air;
a turbocompressor comprising a turbine and a compressor, and connected to said control valve to receive bleed air; wherein said turbine is rotated by the received bleed air and said received bleed air is evacuated as turbine exhaust air;
a regenerative heat exchanger receiving bleed air and cooling said bleed air by passing turbine exhaust air in thermally conductive proximity to said bleed air to generate cooled bleed air and expels turbine exhaust air into ram air;
wherein said turbine rotates the compressor and the compressor receives said cooled bleed air and generates compressed air;
a primary heat exchanger receiving compressed air from said turbocompressor; wherein said primary heat exchanger cools said compressed air by passing said compressed air in thermally conductive proximity to ram air.

10. The gas generation system of claim 9 further comprising an overtemperature valve controlling air flow from said primary heat exchanger and an air separation module.

11. The gas generation system of claim 10, wherein said air separation module provides oxygen enriched air and nitrogen enriched air.

12. The gas generation system of claim 11 wherein said nitrogen enriched air is distributed to a fuel tank.

13. The gas generation system of claim 9 wherein said turbocompressor comprises a turbine and a compressor.

14. The gas generation system of claim 13 wherein said turbine is rotationally connected to said compressor.

15. The gas generation system of claim 9 wherein said turbocompressor provides compressed air to said primary heat exchanger.

16. The gas generation system of claim 9 further comprising a flow restriction device regulating air flow from the regenerative heat exchanger to the ram flow outlet.

17. The gas generation system of claim 9 further comprising an ejector forcing air flow from the regenerative heat exchanger to the ram flow outlet.

18. A method of gas generation thermal control comprising:
generating rotational motion in a turbine using bleed air;
rotating a compressor using said rotational motion;
receiving bleed air at a regenerative heat exchanger;
receiving cooled air from the turbine;
providing cooled bleed air to the compressor;
providing compressed air from the compressor;
porting exhaust air from the regenerative heat exchanger to a ram air outlet.

19. The method of claim 18 wherein a check valve prevents compressed air from circulating.

20. The method of claim 18 wherein said exhaust air is provided to a flow restriction device.

* * * * *